Patented Aug. 20, 1935

2,012,166

UNITED STATES PATENT OFFICE 2,012,166

PURIFICATION OF LIQUID

Edwin William Arnold Humphreys, Westminster, London, England

No Drawing. Application February 12, 1934, Serial No. 710,894. In Great Britain November 25, 1932

4 Claims. (Cl. 210—29)

This invention relates to methods of adding materials (for example sulphate of alumina, copper sulphate, potassium permanganate, and activated carbon) to water and other liquids, hereinafter referred to as "water", for effecting purification of the water. It has heretofore been customary to measure these materials by weight or volume in a dry state by machine and to feed them either directly into the water to be purified, or into a continuously flowing small stream of water which is intended to carry the materials in solution or suspension and subsequently passes into the main stream or body of water to be purified. It has been found however that this method involves considerable waste and inefficiency particularly with materials of low solubility such as potassium permanganate or with insoluble substances such as carbon. The reason or main reason for this defect is that the material carried in suspension is deposited in the pipes and chambers used in the purification process before it is dissolved or before it has completed the action or the purification for which it is used. The main object of the present invention is to obviate this defect.

According to an important feature of the invention the material is measured by weight or volume and fed into a grinding, pulverizing, or similar machine, and reduced therein to such a fine state that later it is either completely dissolved or is so finely divided that it remains in suspension in the water as long as is desirable for the particular purification plant. It is frequently desired for some of the material to become deposited fairly evenly with the sludge in the sedimentation tanks and only a sufficient amount being carried in suspension to the filter to form a filtering layer without too much deposit at the filter which would cause clogging to occur too quickly. According to another important feature of the invention the material is ground or pulverized whilst in a wet state so that the material is subsequently added to the water in the form of milk or slurry. Nearly all of the material if ground dry should pass through a normal 200 mesh sieve but an even finer division can be obtained if ground wet. The material may be fed by a dry chemical feed machine directly into a wet grinder and there ground into a state of very fine division and subsequently passed out of the wet grinder at approximately the same rate at which it enters and is then fed in the form of a milk or slurry (with or without the addition of further water) into the water to be purified. Some of the material in the milk or slurry may be in solution. The material may be fed into a small grinding mill and a stream of water passed through the mill at the same time whereby dust nuisance is avoided, a finer grinding can be obtained, and by regulating the rate of flow of the water through the mill the degree of fineness of grinding can be regulated.

For some purposes it has been a practice to add a measured quantity of a coagulant or other chemical to a stream of water for the purpose of precipitating or coagulating various impurities or altering the acidity or other chemical property. Various such chemicals have been employed including acid and basic sulphate of alumina, ferrous sulphate, lime soda ash and chloride of lime. Water supplies have also been treated with carbon (known as active or activated carbon) for the removal of tastes, odours, and colouring matter and other purposes. The precipitated matter and the carbon are subsequently removed by sedimentation or filtration or both. When it is desired to treat a liquid both with a chemical and with carbon it has been a practice to feed measured quantities of the chemical and carbon both in the form of small particles or granules into a water supply by separate feeding machines. With a view to avoiding two machines it has been proposed to prepare a solution of the chemical having carbon in suspension but this is not altogether satisfactory because it requires a method of maintaining the carbon in suspension entailing additional cost and causing difficulties with the feeding apparatus by clogging orifices, screens or other parts. A further object of the invention is to obviate these difficulties.

According to a further feature of the invention the chemical is mixed thoroughly with the dry powdered carbon in the desired proportions so that small quantities of the mixture contain said proportions. The mixture is preferably measured and fed in the required quantities in dry form into the liquid to be treated. In order to ensure intimate mixture of the chemical and carbon they are preferably ground separately and then mixed in the desired proportions. The mixture may be passed through a grinding machine before being passed into the liquid. If sulphate of alumina is used, the proportions may be fifteen parts by weight of the former to one of carbon but these proportions may be varied according to conditions and requirements and may also be varied if other chemicals are used. The mixture may be fed into a comparatively small stream of liquid to form a slurry which flows continuously or intermittently into the main liquid supply. The liquid after treatment may be filtered or otherwise treated to remove solid matter. The chemical and carbon will act on the impurities in the liquid for precipitating certain contents and deodourizing, de-chlorinating, and otherwise purifying the liquid in the usual way. The coagulant and carbon can be properly ground and mixed and sold ready for use thereby obviating the necessity for the users to measure the desired proportions or to provide separate feeding machines. Carbon and sulphate of alumina and certain other mixtures may be treated with a small quantity of water and then dried whereby the materials are fixed in desired proportions in small quantities of the mixture and the mixture will be formed into fairly hard grains in which form it is convenient for feeding by a dry feeding machine.

In some circumstances the carbon or chemical or both may be mixed in granular form and measured and fed in this form or may be ground together after measuring and fed in a wet or dry state.

In addition to obviating the difficulties already above referred to the invention has other advantages. For example some chemicals such as chloride of lime and sulphate of alumina are difficult to feed by dry feed machines owing to their tendency to cake or clog but this tendency is considerably reduced when carbon is mixed with these chemicals. The measuring and feeding of activated carbon separately also has attendant difficulties partly because of the dust nuisance and also because of its tendency for packing or consolidating when disturbed or agitated and for arching over the outlet of the usual dry feed hopper. These difficulties are also considerably reduced by mixing the carbon with the chemical and feeding the mixture. The carbon also tends to reduce the corrosive effect of such chemicals as sulphate of alumina and chloride of lime as it prevents them from caking and adhering to the surfaces, corners and crevices of the measuring or feeding apparatus where corrosion might proceed for some time unnoticed.

The reduction of activated carbon and some other materials to a finely divided state has the additional advantage that the more finely the particles are divided the greater, within limits, is the area exposed for adsorption.

By means of the present invention also efficient purification of the water can be effected with a less quantity of some materials than has heretofore been necessary or desirable. The material can be purchased in its cheapest form and measured in that form and subsequently ground or pulverized so that it is used in its most efficient form. Two or more materials requiring to be intimately mixed can be handled together in appropriate circumstances in the same dry feed machine, dry grinder, wet grinder or pulverizer to advantage.

Any suitable feeding, measuring, weighing, and grinding machines may be used, and any suitable apparatus may be used in applying materials to water. The various parts of the complete apparatus may be arranged to operate more or less independently or the construction may be such that the material passes automatically from one part of the complete apparatus to another. If desired means may be provided for measuring desired quantities of the dry or wet ground or pulverized material and for adding the measured quantities to the water at spaced intervals. Grinding may be effected in two stages if desired, i. e., a coarse grinding and a fine grinding and ball, roller, conical disc, or other type of grinder may be employed.

What I claim and desire to secure by Letters Patent of the United States is:—

1. A continuous process for treating a liquid which consists in mechanically and continuously measuring material for treating the liquid in dry condition, feeding the material so measured into a grinding machine, reducing the material to a fine state of division, delivering the material from the grinding machine at the same rate as it is fed into the grinding machine, and then introducing the material into the liquid at the same rate without further measuring so that measuring of the material occurs only prior to grinding.

2. A continuous process for treating a liquid which consists in mechanically and continuously measuring material for treating the liquid in dry state, feeding the measured material into a wet grinding machine, reducing the material to a very fine state of division, supplying a stream of liquid to the material being reduced, delivering the material by said stream of liquid at the same rate as it is fed into the grinding machine, and then feeding the material in the form of a milk or slurry into the liquid to be treated.

3. A continuous process for treating a liquid which consists in mechanically and continuously measuring material for treating the liquid in dry condition, feeding the material so measured into a grinding machine, reducing the material to at least such a fine state of division that it will nearly all pass through a 200 mesh sieve, delivering the material from the grinding machine at the same rate as it is fed into the grinding machine, and then introducing the material into the liquid at the same rate without further measuring so that measuring of the material occurs only prior to grinding.

4. A continuous process for treating a liquid which consists in mechanically and continuously measuring material for treating the liquid in dry state, feeding the measured material into a wet grinding machine, reducing the material to at least such a fine state of division that it will nearly all pass through a 200 mesh sieve, supplying a stream of liquid to the material being reduced, delivering the material by said stream of liquid at the same rate as it is fed into the grinding machine, and then feeding the material in the form of a milk or slurry into the liquid to be treated.

EDWIN WILLIAM ARNOLD HUMPHREYS.